United States Patent [19]

Gianopulos

[11] 3,746,913

[45] July 17, 1973

[54] CATHODE RAY DEFLECTION SYSTEM USING FIELD EFFECT TRANSISTORS

[75] Inventor: William Gianopulos, West Hurley, N.Y.

[73] Assignee: International Business Machines Corporation, Armonk, N.Y.

[22] Filed: Dec. 22, 1971

[21] Appl. No.: 211,024

[52] U.S. Cl. .......................... 315/27 TD, 307/221 C
[51] Int. Cl. .............................................. H01j 29/76
[58] Field of Search ............ 315/18, 27 TD, 27 GD; 307/221 C

[56] References Cited

UNITED STATES PATENTS

| | | | |
|---|---|---|---|
| 3,641,556 | 2/1972 | Jones | 315/18 |
| 3,431,433 | 3/1969 | Ball et al. | 307/221 |
| 3,489,946 | 1/1970 | Granberg et al. | 315/18 |

OTHER PUBLICATIONS

"Application Notes, MTOS Shift Registers;" Sidorsky, G. I. Corp., Corp., Dec. 1967, pp. 1–7.

*Primary Examiner*—Carl D. Quarforth
*Assistant Examiner*—J. M. Potenza
*Attorney*—James E. Murray et al.

[57] ABSTRACT

This specification discloses how a FET shift register can be used to generate deflection voltages for cathode ray tubes. Each stage of the shift register contains two cross-connected FET's, each with a FET load device coupling it to a source of power, When a binary "1" is stored in a particular stage current is drawn through one of these FET load devices and when a binary "0" is stored in this stage current is drawn through the other of the FET load devices. The two FET load devices are separately connected to one of the two load devices in each of the other stages of the shift register so that you have two summing circuits whose outputs vary with the data stored in the shift register. These outputs are connected to the deflection coil of a cathode ray tube so that by changing the data in the shift register in a particular manner the cathode ray beam can be made to scan the face of the tube.

5 Claims, 3 Drawing Figures

CATHODE RAY DEFLECTION SYSTEM USING FIELD EFFECT TRANSISTORS

BACKGROUND OF THE INVENTION

This invention relates to a field effect transistor shift register and more particularly to the use of such a shift register to generate deflection voltages for a cathode ray tube.

Thorpe U.S. Pat. No. 3,422,304 discloses a cathode ray tube deflection system employing a shift register comprising a series of bistable trigger circuits. The output of these trigger circuits are summed in a weighted resistor network and then fed to a deflection coil of a cathode ray tube so that, as the data stored in the shift register changes the beam can be made to scan the face of the tube. While such a system is desirable it has not been extensively employed because of the cost of trigger circuits and weighted resistors the scheme has not been competitive with analog deflection schemes. A known characteristic of field effect transistor shift registers, when produced on a single monolithic chip, is their low cost relative to other shift registers and it would be desirable to provide a shift register employing FET's in a deflection scheme for cathode ray tubes to obtain these known cost advantages.

BRIEF DESCRIPTION OF THE INVENTION

In accordance with the present invention such a shift register is provided. The shift register comprises a plurality of serially connected FET bistable stages. Each of the bistable stages contains two cross-connected field effect transistors each with a separate FET load device coupling it to a source of power. When a binary "1" is stored in a particular stage current is drawn through one of the FET load devices and when a binary "0" is stored in the stage current is drawn through the other of the FET load devices. The two FET load devices are separately connected to one of the two load devices in each of the other of the stages so that you end up with two summing circuits whose outputs vary with the data stored in the shift register. These outputs are fed to the deflection coil for the cathode ray tube so that, by changing the data in the shift register in a particular manner, the beam of the electron tube can be made to sweep across the face of the cathode ray tube in a scanning pattern.

Therefore, it is an object of the present invention to provide a new cathode ray deflection system employing field effect transistors.

Another object of the present invention is to provide a cathode ray deflection system which is inexpensive, compact, with low power dissipation and which takes advantage of the tracking characteristics of semiconductive devices made on the same monolithic chip.

DESCRIPTION OF THE DRAWINGS

These and other objects, features and advantages of the invention will be apparent from the preferred embodiment of the invention as illustrated in the accompanying drawings, of which.

DETAILED DESCRIPTION OF THE EMBODIMENT OF THE INVENTION

Figure 1:
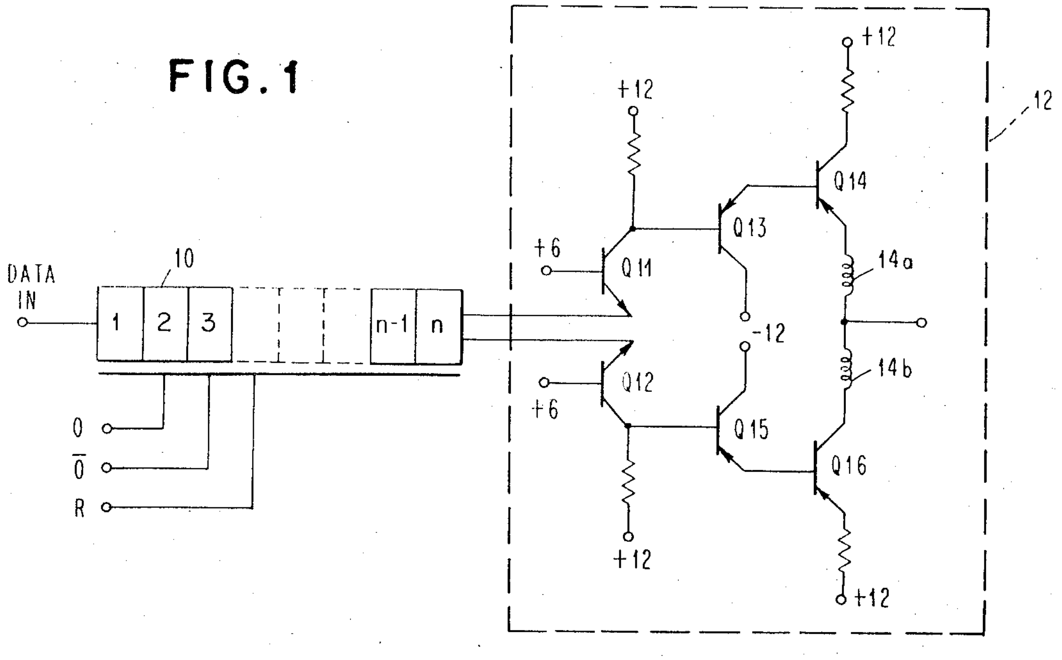
FIG. 1 is an electrical schematic showing how a shift register, in accordance with the present invention, is connected to a cathode ray oscilloscope.
Figure 2:
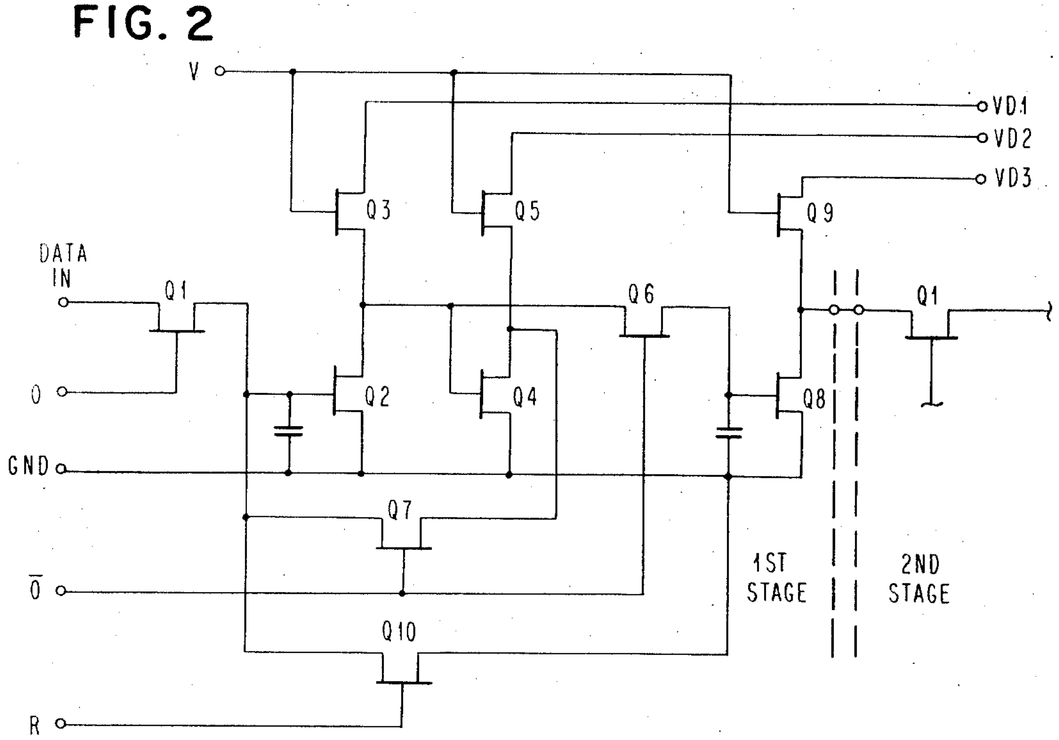
FIG. 2 is an electrical schematic of one stage of the shift register shown in FIG. 1.

Referring to FIG. 1, the shift register 10 is a static FET shift register where each of the stages 1 through $n$ contains cross-connected FET flip-flops. As shown in FIG. 2 in each stage the gate of device Q4 is connected directly to the drain of the other cross-connected device Q2 to form one of the cross-connections and the gate of device Q2 is connected through the drain to source path of device Q7 to the drain of device Q4 to form the other of the two cross-connections.

In each of the stages, the load device Q3 couples the drain of cross-connected device Q2 to the emitter of transistor Q11 in the push-pull driver 12 while in each of the stages the load device Q5 couples the drain of cross-connected device Q4 to the emitter of transistor Q12. The current flowing through the transistors Q11 and Q12 will, therefore, depend on what state the cross-connected cell is in in each of the stages of the shift register. For instance, assume that a "0" is stored in each of the stages of the shift register. Then device Q4 would be conducting in each of the stages of the shift register and device Q2 would be non-conducting in each of the stages of the shift register. This being the case, the current through transistor Q11 would be the summation of all the currents passing through devices Q3 in each of the stages of the shift register and, therefore, transistor Q11 would be conducting very lightly while the current through transistor Q12 would be the summation of all the currents passing through devices Q5 in each of the stages of the shift register so that transistor Q12 would be conducting very heavily. This is represented by the current waveforms on voltage lines VD1 and VD2 in FIG. 3 at time T0. In the other extreme, suppose all the cells in the shift register 10 stored a "1". Then device Q2 would be conducting and device Q4 would be non-conducting. In that case, the current at node VD1 would represent the summation of the current in all the conducting devices, while voltage VD2 would represent the current in all the non-conducting devices so that transistor Q11 would be conducting very heavily and transistor Q12 would be conducting lightly. This is represented at time T5 in FIG. 3. In all other conditions where certain of the stages store a "1" in shift register 10 and other stages store a "0" in shift register 10, the voltages at VD1 and VD2 will fall at some level between the voltage at time T0 and the voltage at time T5.

Thus, it can be seen that the currents at the collectors of transistors Q11 and Q12 are in phase opposition and can be changed by changing the data in shift register 10. These currents are amplified by amplifier stages consisting of transistors Q13 and Q14 for the collector currents of transistor Q11 and transistors Q15 and Q16 for the collector currents of transistor Q12 and passed through the push-pull yolk 14*a* and 14*b* of a cathode ray tube. Therefore, by changing the data stored in the shift register the current through the push-pull yolk can be altered to deflect the beam across the face of the tube. The refinement of steps of this deflection of current will depend on the number of stages $n$ in the shift register.

Figure 3:
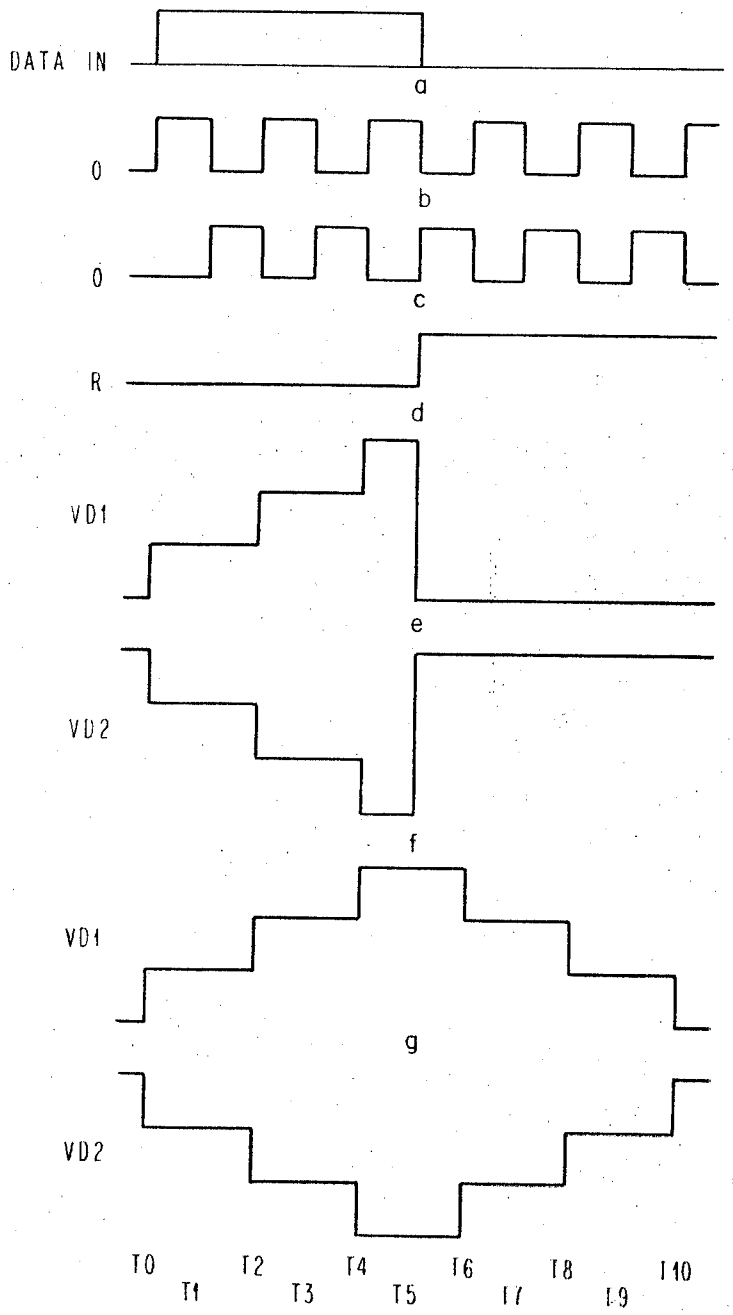
FIG. 3 is a number of voltage curves used to operate a simplified version of the shift register shown in FIGS. 1 and 2.

In the diagram of FIG. 3, it is assumed that the shift register has three stages and three steps are used. However, this is only for illustration and in a typical FET shift register many more stages would be used. For example, a 250 stage shift register would be suitable for this application and the more stages in the shift register the more accurate the beam could be positioned on the face of the tube.

To show how the data is changed to cause deflection across the face of the tube, let us assume that initially each of the stages of the shift register contains a "0" so that in each stage device Q4 is conducting and device Q2 is non-conducting. Then a "1" signal is applied to the first stage of the shift register so that the drain of device Q1, coupling the input to the first stage to the gate of device Q2, is raised. At the same time the phase signal $\phi$ is raised to raise the potential at the gate of device Q2. This causes device Q2 to conduct dropping the voltage at the gate of device Q4 and turning it off. With device Q2 conducting, the current increases through device Q3 so that the summation of current at node VD1 increases one level. At the same time the current in device Q5 of the first stage is reduced so the summation at node VD2 decreases one level at time T0 as shown in FIG. 3. As the phase signal drops the not phase signal $\bar{\phi}$ rises and device Q6 conducts coupling the drain of device Q2 to the gate of device Q8, thereby discharging the gate of device Q8 to ground through device Q2. At the same time device Q7 is turned on so that the current flowing through device Q5 maintains the node at the gate of device Q2 charged with the current from device Q5 while device Q1 is turned off. Thus, after the not phase signal $\bar{\phi}$ subsides a "1" is stored in the first stage of the shift register while a "0" is stored in all the other stages of the shift register.

The reoccurrence of the phase signal $\phi$ at the input to the first stage at time T2 causes the first stage to again maintain its "1" condition since the data in signal remains at an up level and maintains the node at the gate of device Q2 charged so that a "1" is maintained in the first stage. The second stage, however, will now change because the output of the first stage will be coupled to the gate of device Q2 in the second stage by the conduction of device Q1 in the second stage. Up until now the drain of device Q1 in the second stage was maintained at zero volts by the conduction of device Q8 on the previous clock cycle. However, with the discharging of the node at the gate of device Q8, device Q8 has been turned off so that the source of device Q9 is allowed to rise charging the node at the gate of device Q2 through device Q1 of the second stage and again the sequence of events previously described for the first stage occurs for the second stage so that at the cessation of the second not phase pulse $\bar{\phi}$ there is a "1" stored in the first and second stages of the shift register while there is a "0" stored in each of the succeeding stages. It can be seen that with each occurrence of the phase ($\phi$) and not phase ($\bar{\phi}$) pulses one more stage of the shift register shifts from storing a "0" to storing a "1". This is continued until all of the stages of the shift register store a "1".

When all the stages of the shift register store a "1", the condition existing at time T5, in FIG. 3, arises and the beam has scanned the face of the cathode ray tube in one direction. The beam can now be made to scan in the other direction in two ways. If a fly-back action is desired, at time T5 a restore pulse R can be applied to all of the stages in shift register 10 so that the node at the gate of device Q2 is discharged through device Q10 placing a "0" in each of the stages of the shift register. This immediately restores the shift register to the conditions existing at time T0. Alternatively, if a stepped return is desired, the data in signal is reduced to zero at time T5. Now, when the first phase signal ($\phi$) after T5 occurs (at time T6) the node at the gate of device Q2 is discharged to zero through device Q1. Subsequently, the occurrence of the not phase signal ($\bar{\phi}$) causes the node at the gate of device Q8 to charge turning device Q8 on so that when the phase signal ($\phi$) again occurs at time T7, it will change the data stored in the second stage of shift register 10 because device Q2 will now discharge through device Q1 and device Q8 to ground. Furthermore, as long as the data in signal remains at zero the data in the shift register stages will change in sequence from a binary "1" to a binary "0" until all the shift register stages contain a binary "0".

Therefore, it can be seen with this shift register that a beam can be made to scan the face of a cathode ray tube by changing the data in the shift register. This shift register can be produced inexpensively because it can be produced on a single monolithic chip so that the disadvantages of the mentioned prior art patent are avoided. Furthermore, the fact that the shift register is produced on a single chip minimizes the number of interconnections that must be made with the shift register which was a problem in the case of the prior art where interconnections had to be made between the shift register and the weighted resistors.

Therefore, it should be understood by those skilled in the art that various changes in form and details may be made therein without departing from the spirit and scope of the invention.

What is claimed is:

1. A deflection system using a field effect transistor shift register to deflect the beam of a cathode ray tube comprising:

a shift register having only one input stage and a plurality of other stages each stage including two cross-connected field effect transistors each transistor having a load field effect transistor for supplying power to maintain the cross-connected transistors operating in one of their bistable states;

means coupling one of the load transistors in each of the stages in parallel to a source of potential through a summing circuit so that the current through the summing circuit varies as a function of the data stored in the storage cell;

means for driving the deflection coil of a cathode ray tube as a function of the current through the summing circuit;

a single periodic pulse means coupled to all the stages for transferring the data stored in any given stage of the shift register to the next stage of the shift register; and input means for applying one type of binary data to only the input stage of the shift register while the periodic pulse means operates so that the stages of the shift registers change state one stage at a time to generate a ramp function thus causing the beam of the cathode ray tube to sweep across the face of the tube.

2. The deflection system of claim 1 including restore means for switching all the stages in parallel to the other type of binary data.

3. The deflection system of claim 2 wherein said restore means is for discharging the charge at the gate of one of the cross-connected transistors in each of the stages.

4. The deflection system of claim 1 wherein said input means includes means for the application of said other type of binary data to said input stage while the periodic pulse means operates.

5. The deflection system of claim 1 wherein:

the deflection coil of the cathode ray tube is a split coil;

one of the load field effect transistors in each stage is connected in parallel to one summing circuit which drives one end of the split coil; and the other of the load field effect transistors in each stage is connected in parallel to a second summing circuit which drives the other end of the split coil.

* * * * *